United States Patent [19]
DeCotis

[11] Patent Number: 5,893,198
[45] Date of Patent: Apr. 13, 1999

[54] EYEGLASS-HOLDER NECKLACE ASSEMBLY

[75] Inventor: Deborah A. DeCotis, New York, N.Y.

[73] Assignee: La Loop, New York, N.Y.

[21] Appl. No.: 09/045,549

[22] Filed: Mar. 20, 1998

[51] Int. Cl.$^6$ ................................................ A44B 21/00
[52] U.S. Cl. .................. 24/3.3; 24/298; 24/3.13; 224/617
[58] Field of Search ...................... 24/3.11, 3.13, 24/3.3, 3.6, 298–302, 265 AL, 265 EC, 265 H, 555; 63/3.1, 4, 10, 11; 2/445; 224/251, 255, 600, 607, 616, 617; 248/902

[56] References Cited

U.S. PATENT DOCUMENTS

| | | |
|---|---|---|
| Re. 17,450 | 10/1929 | Sifris . |
| 471,734 | 3/1892 | Maier, Jr. . |
| 1,189,199 | 6/1916 | Hachmann . |
| 1,412,011 | 4/1922 | Bohm . |
| 2,218,932 | 10/1940 | Collins ............................ 24/3.13 X |
| 2,634,470 | 4/1953 | De Grafft, Jr. .......................... 24/3 |
| 3,148,812 | 9/1964 | Hilsinger, Jr. ........................ 224/5 |
| 3,905,610 | 9/1975 | Dini ................................ 24/302 X |
| 4,458,384 | 7/1984 | Arnold .................................. 24/3 |
| 4,674,298 | 6/1987 | Wimmershoff-Caplan ............ 63/1 |
| 4,894,887 | 1/1990 | Ward, II ............................... 24/3 |
| 5,005,263 | 4/1991 | Barrett ............................... 24/3.3 |
| 5,027,477 | 7/1991 | Seron ............................ 24/3.13 X |
| 5,033,612 | 7/1991 | Bivins ................................ 206/5 |
| 5,305,934 | 4/1994 | Grey ................................. 224/207 |
| 5,319,838 | 6/1994 | Eppenauer ............................. 24/3 |
| 5,425,485 | 6/1995 | Carlo ............................. 24/298 X |
| 5,465,466 | 11/1995 | Napier ............................... 24/3.3 |
| 5,600,873 | 2/1997 | May ............................... 24/3.3 X |
| 5,722,123 | 3/1998 | Vasilopoulos .................. 24/3.13 X |

*Primary Examiner*—Anthony Knight
*Assistant Examiner*—Robert J. Sandy
*Attorney, Agent, or Firm*—Kalow, Springut & Bressler

[57] ABSTRACT

A necklace assembly for holding a pair of eyeglasses includes an elongated flexible necklace for wearing about the neck of a wearer and an eyeglass-holder assembly connected between first and second ends of the necklace. The eyeglass-holder assembly includes an eyeglass-holder loop having a temple-piece-receiver loop opening for receiving a temple piece of a pair of eyeglasses and a first and a second swivel linker. Each swivel linker has a necklace-side connector and a holder-loop-side connector rotatably joined together for full rotation about a swivel axis. The holder-loop-side connectors of the first and the second swivel linker are connected to the eyeglass-holder loop at locations spaced apart from one another about the loop. The necklace assembly also includes necklace/holder-assembly couplers connecting the respective ends of the necklace with the necklace-side connectors of corresponding swivel linkers of the eyeglass-holder assembly. The necklace assembly may be worn about the neck of a wearer with a pair of eyeglasses in a folded-closed configuration removably pendulously held in the eyeglass-holder loop of the eyeglass-holder assembly with a temple piece extending downwardly from one side of the temple-piece-receiver loop opening and a lens frame of the eyeglasses extending downwardly from an opposite side of the loop opening and with twisting or kinking of the necklace induced by movement of the wearer tending to be relieved by rotation of the swivel linkers to which the ends of the necklace are connected.

12 Claims, 2 Drawing Sheets

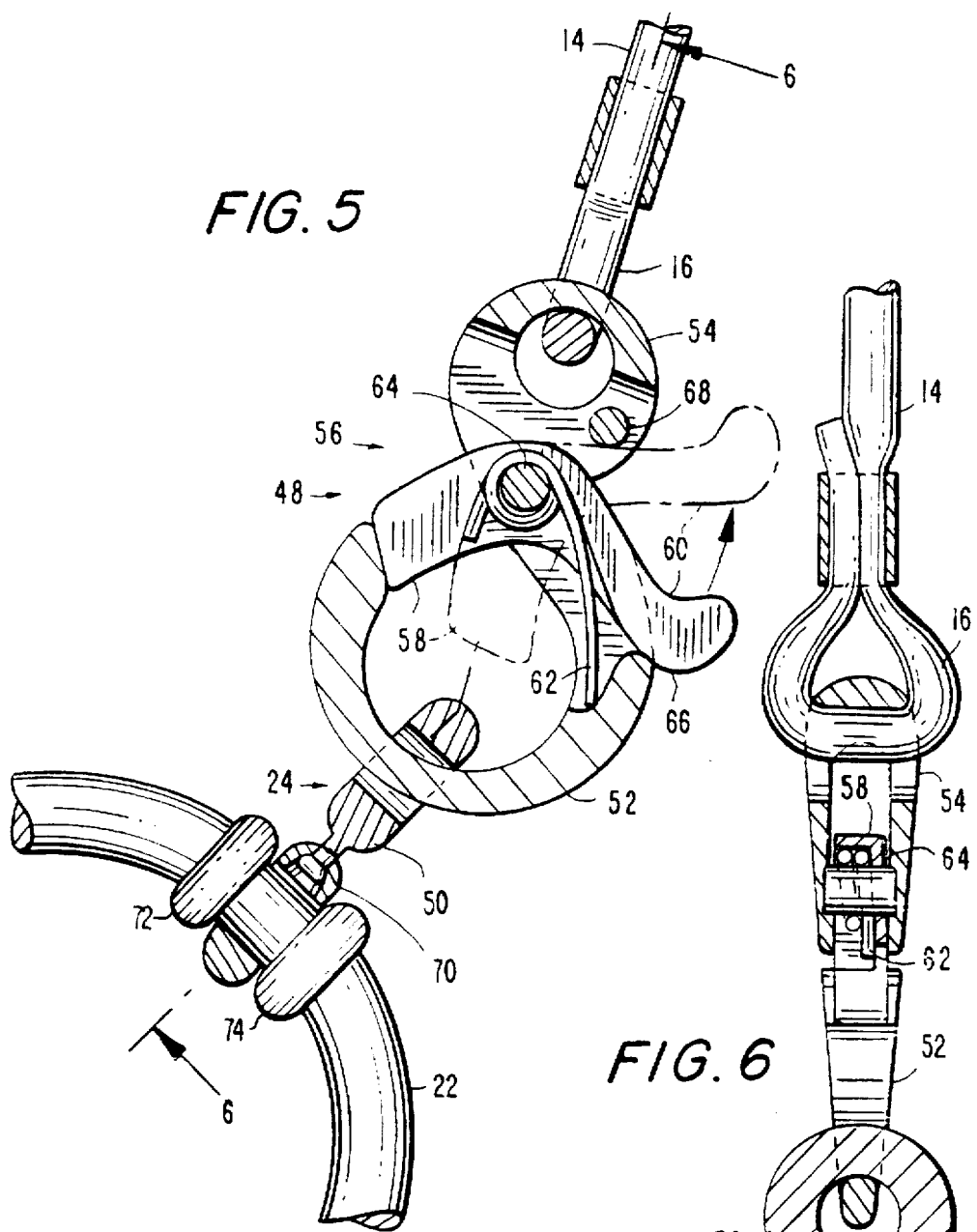
FIG. 5
FIG. 6
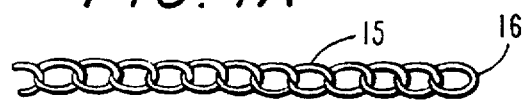
FIG. 7A
FIG. 7B

EYEGLASS-HOLDER NECKLACE ASSEMBLY

FIELD OF THE INVENTION

The present invention relates to a holder for a pair of eyeglasses and, more particularly, to a necklace assembly for holding eyeglasses which can be worn about the neck.

BACKGROUND ART

Generally, persons who wear eyeglasses remove and replace them frequently during the course of a day. When an eyeglass wearer removes his or her eyeglasses, it is usually desired to keep the eyeglasses close at hand in order to be able to replace them conveniently. Upon removing eyeglasses, therefore, eyeglass wearers frequently place the eyeglasses in a pocket of a shirt or coat, or hang the eyeglasses from a neck opening of a sweater or a blouse by inserting a temple piece of the eyeglasses down inside the garment. However, eyeglasses may fall from a shirt or coat pocket or from a neck opening of a sweater or blouse when the eyeglass wearer bends over, which is at best an annoyance and which can result in damage to the eyeglasses. In addition, certain styles of garments do not have pockets or neck openings suitable for holding eyeglasses.

U.S. Pat. No. 4,894,887 to Ward disclosed an eyeglass carrier clip which could be clipped to a shirt pocket of an eyeglass wearer for supporting a pair of eyeglasses by one of its temple pieces. According to the patent, as a result of the pendulous nature of the support of eyeglasses, the eyeglass carrier clip of the patent would retain the eyeglasses even when the user bent over. However, the eyeglass carrier clip of the patent requires that the user wear a garment with a pocket suitable for clipping the device, which may not always be desired. In addition, eyeglass wearers often pay premium prices to obtain eyeglasses of designs which they consider to be stylish and attractive, and items clipped to a shirt pocket such as the eyeglass carrier clip of the patent might be regarded as unattractive by many of such eyeglass wearers.

U.S. Pat. No. 5,305,934 to Grey disclosed a tool and eyeglass holder which could be hung about the neck of a wearer for holding a pair of eyeglasses and a screwdriver and spare screws for repairing the eyeglasses. Holders specifically described in the patent included a flexible cord or other elongated flexible member, each end of which was either directly attached to a loop element or formed into a loop by crimping back onto itself. The loops at the ends of the elongated flexible member were respectively connected to corresponding loops at the ends of a tool container for the screwdriver and screws by interlocking the respective loops. A loop element extended below the tool container from which a pair of eyeglasses could be hung by inserting a temple piece of the eyeglasses through an aperture defined by the loop. Because of the interlocked loops connecting the flexible member to the tool container, the tool and eyeglass holder of the patent would have to be slipped over the head of the user to be hung about the user's neck, which could be inconvenient and disarrange coiffured hair. Moreover, movement by a user of the tool and eyeglass holder of the patent would be expected to tend to cause the flexible member to become twisted or kinked, which users might regard as unsightly for an item hung about the neck.

SUMMARY OF THE INVENTION

I have invented a necklace assembly for holding a pair of eyeglasses neatly and securely even as a wearer of the necklace assembly moves about and which avoids problems of the prior art noted above.

The necklace assembly of the invention comprises an elongated flexible necklace for wearing about the neck of a wearer and an eyeglass-holder assembly connected between first and second ends of the necklace. The eyeglass-holder assembly of the necklace assembly of the invention includes an eyeglass-holder loop and a first and a second swivel linker. The eyeglass-holder loop of the eyeglass-holder assembly has a temple-piece-receiver loop opening which is shaped and dimensioned to receive a temple piece of a pair of eyeglasses. Each swivel linker of the eyeglass-holder assembly has a necklace-side connector and a holder-loop-side connector which are rotatably joined together for full 360-degree rotation about a swivel axis associated with the swivel linker. The holder-loop-side connectors of the two swivel linkers are connected to the eyeglass-holder loop at locations which are spaced apart from one another about the loop. A first necklace/holder-assembly coupler connects the first end of the necklace with the necklace-side connector of the first swivel linker of the eyeglass-holder assembly and a second necklace/holder-assembly coupler connects the second end of the necklace with the necklace-side connector of the second swivel linker of the eyeglass-holder assembly.

The necklace assembly of the invention may be worn about the neck of a wearer with a pair of eyeglasses in a folded-closed configuration removably pendulously held in the eyeglass-holder loop of the eyeglass-holder assembly with a temple piece extending downwardly from one side of the temple-piece-receiver loop opening and a lens frame of the eyeglasses extending downwardly from an opposite side of the loop opening. The necklace assembly of the invention advantageously tends to retain the eyeglasses securely in the eyeglass-holder loop of the eyeglass-holder assembly as the wearer moves about or even bends over. Advantageously, twisting or kinking of the necklace of the necklace assembly of the invention induced by movement of the wearer tends to be relieved by rotation of one or both of the swivel linkers about the associated swivel axis so that the necklace assembly tends to lie neatly on the chest of the wearer when the wearer stands or sits upright.

Preferably, the eyeglass-holder loop of the eyeglass-holder assembly of the necklace assembly of the invention is in the shape of a ring. The ring-shaped eyeglass-holder loop preferably has a diameter in the range of from 0.4 to 1.3 inches, with a diameter of about 0.9 inches being particularly preferred.

In a preferred embodiment of the invention in which the eyeglass-holder loop is ring shaped, the holder-loop-side connector of each swivel linker is pivotally connected to the eyeglass-holder loop. A pivot axis associated with the swivel linker is defined as an axis about which the swivel linker and the eyeglass-holder loop can pivot relative to one another. The pivot axis associated with each of the swivel linkers preferably lies at least approximately in a plane defined by the ring-shaped eyeglass-holder loop. The swivel axis associated with each swivel linker preferably extends generally perpendicular to the pivot axis associated with the swivel linker.

In preferred embodiments of the invention in which the eyeglass-holder loop of the eyeglass-holder assembly is in the shape of a ring, the first and the second swivel linkers of the eyeglass-holder assembly are preferably spaced apart from one another azimuthally by an angle in the range of from 55° to 125° of arc about the ring-shaped eyeglass-holder loop. In a particularly preferred embodiment, the first and second swivel linkers are spaced apart from one another azimuthally by an angle of approximately 90° of arc about the ring-shaped eyeglass-holder loop.

Preferably, the necklace of the invention is an ornamental jewelry chain. In preferred embodiments of the necklace assembly of the invention, one of the necklace/holder-assembly couplers is a releasable clasp to permit the necklace assembly to be removed from about the neck of a wearer without slipping the necklace assembly over the wearer's head.

BRIEF DESCRIPTION OF THE DRAWINGS

Preferred embodiments of the eyeglass-holder necklace assembly of the invention will be described below with reference to the following figures:

FIG. 5 is an enlarged partial cross-sectional view of a spring-loaded releasable clasp and a swivel linker of the necklace assembly of FIG. 1.

FIG. 6 is a partial cross-sectional view taken along line 6.6' of FIG. 5.

FIGS. 7A and 7B are elevations of alternative necklaces for preferred embodiments of the necklace assembly of the invention.

DETAILED DESCRIPTION OF THE PREFERRED EMBODIMENTS

Figure 1:
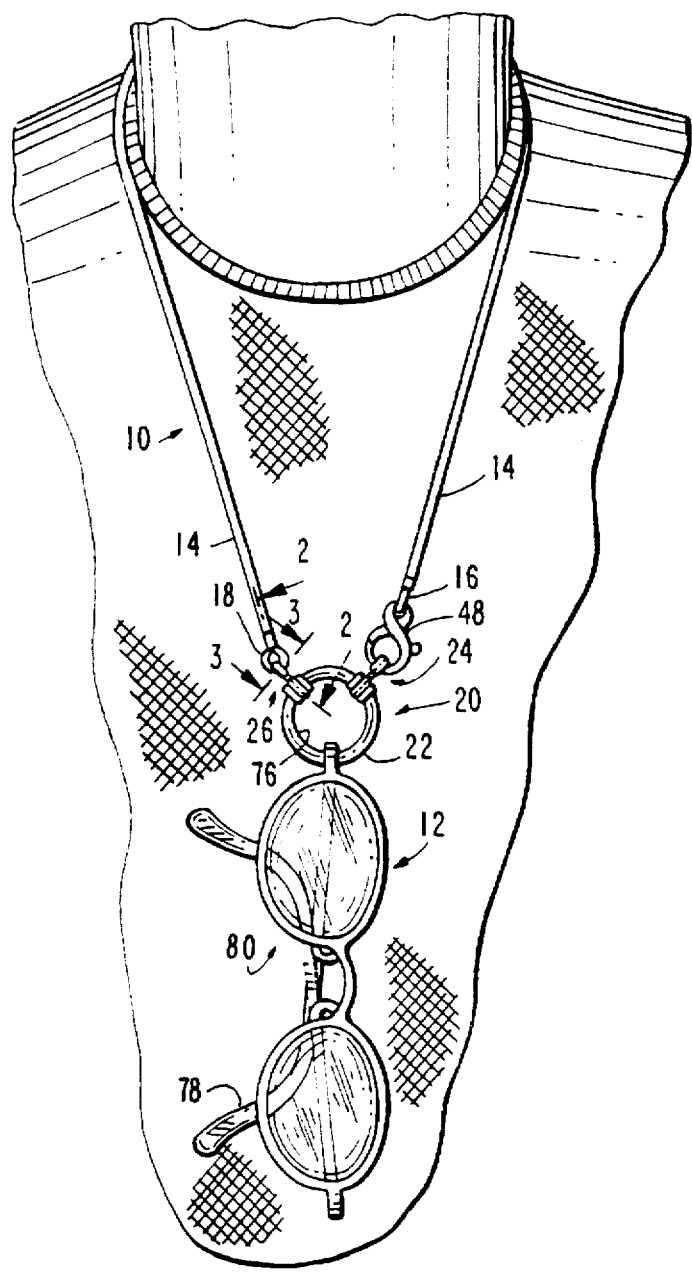
FIG. 1 is an elevation of a preferred eyeglass-holder necklace assembly of the invention as worn about the neck of a wearer.

Turning now to FIG. 1, a necklace assembly 10 for holding a pair of eyeglasses 12 includes an elongated flexible necklace 14. Although for simplicity and clarity of illustration, the necklace 14 shown in FIG. 1 is a simple cord, it is particularly preferred for the necklace to be an ornamental jewelry chain, such as the jewelry chain necklaces 15 and 17 shown in FIGS. 7A and 7B or a string of beads. For example, the jewelry chain necklace 15 could be a jewelry chain made of gold, silver or other precious metal or of a mock-tortoise-shell or mock-ivory plastic material. At opposite ends of the necklace 14 are a first necklace terminal loop 16 and a second necklace terminal loop 18.

An eyeglass-holder assembly 20 is connected to the two terminal loops 16, 18 of the necklace 14. The eyeglass-holder assembly 20 includes an eyeglass-holder ring 22, a first swivel linker 24, and a second swivel linker 26.

The two swivel linkers 24, 26 are constructed identically. As shown best in FIG. 2, the second swivel linker 26 includes a necklace-side connector ring 28 and a holder-ring-side connector ring 30. The necklace-side connector ring 28 and the holder-ring-side connector ring 30 of the swivel linker 26 are rotatably connected together by a pin-and-socket arrangement.

In particular, the necklace-side connector ring 28 of the second swivel linker 26 has a linker pin 32 projecting radially outwardly from an outer circumferential surface of the connector ring 28. The linker pin 32 is substantially rotationally symmetric about an axis which defines a swivel axis associated with the second swivel linker 20. The linker pin 32 has a head portion 34 spaced apart from the outer circumferential surface of the necklace-side connector ring 28 and a neck portion 36 with extends between the head portion 34 and the outer circumferential surface of the connector ring 28. The diameter of the neck portion 36 of the linker pin 32 is narrower than the head portion 34.

The holder-ring-side connector ring 30 of the second swivel linker 26 has an opening passing radially through it which forms a linker-pin retainer bearing socket 38. Inside surfaces of the linker-pin retainer bearing socket 38 are substantially rotationally symmetric with a contour which is complementary to the outside surfaces of the linker pin 32. In particular, the linker-pin retainer bearing socket 38 has a constricted radially outer portion which corresponds to the neck portion 36 of the linker pin 32 and an expanded radially inner portion which corresponds to the head portion 34 of the linker pin. The constricted portion of the linker-pin retainer bearing socket 38 has a smaller inside diameter than the expanded portion.

The linker pin 32 of the necklace-side connector ring 28 of the second swivel linker 26 extends within the linker-pin retainer bearing socket 38 of the holder-ring-side connector ring 30 of the swivel linker 26 and is retained against withdrawal in the swivel axis direction by interference between the greater outside diameter head portion 34 of the linker pin 32 and inner wall portions adjacent to the smaller inside diameter radially outer portion of the socket 38. Inside diameters of the linker-pin retainer bearing socket 38 are sufficiently greater than outside diameters of corresponding portions of the linker pin 32 to provide clearance for the linker pin 32 to rotate unimpeded about the swivel axis in the linker-pin retainer bearing socket 38.

Figure 2:
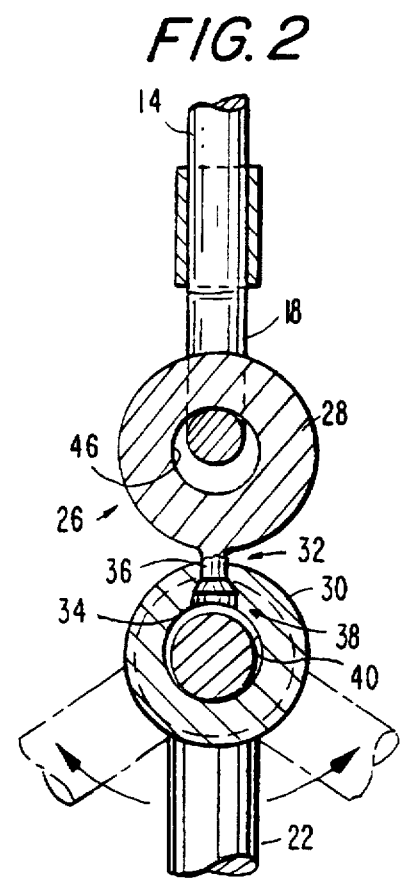
FIG. 2 is a partial cross-sectional view taken along line 2.2' of FIG. 1.

As may be seen in FIGS. 1 and 2, the second terminal loop 18 of the necklace 14 passes through a central opening 46 of the necklace-side connector ring 28 of the second swivel linker 26 to connect a second end of the necklace 14 to the swivel linker 26 by interlinking.

Figure 3:
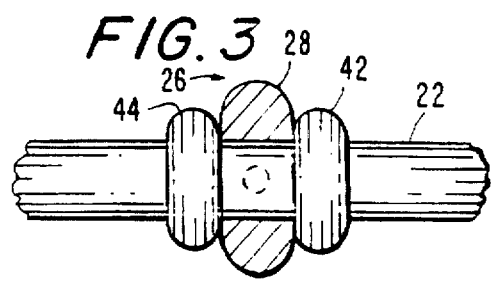
FIG. 3 is a cross-sectional view taken along line 3.3' of FIG. 1, passing through a swivel linker of the necklace assembly.
Figure 4:
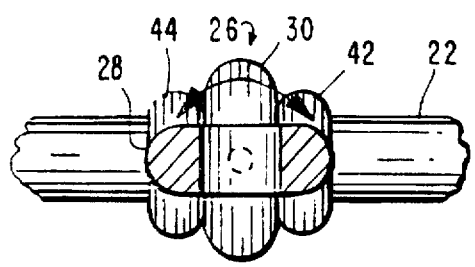
FIG. 4 is a cross-sectional view of the swivel linker illustrated in FIG. 3 with a necklace-side connector ring of the swivel linker rotated by 90°.

As shown best in FIG. 2, the eyeglass-holder ring 22 passes through a connector-ring central opening 40 in the holder-ring-side connector ring 30 of the second swivel linker 26 to connect the swivel linker 26 to the eyeglass-holder ring 22. The second end of the necklace 14 is thus connected to the eyeglass-holder ring 22 by the second swivel linker 26. Corresponding to the second swivel linker 26, the eyeglass-holder ring 22 has a second pair of swivel-linker collar stops 42 and 44 extending around the eyeglass-holder ring 22 on opposing sides of the holder-ring-side connector ring 30 of the second swivel linker 26, as may be seen in FIGS. 3 and 4. The second pair of swivel-linker collar stops 42 and 44 fixes the position of the second swivel linker 26 azimuthally on the eyeglass-holder ring 22. A distance between facing surfaces of the swivel-linker collar stops 42 and 44 of the second pair is greater than a thickness of the holder-ring-side connector ring 30 between the collar stops by a pivot-motion clearance amount. Similarly, an inside diameter of the central connector-ring opening 40 in the holder-ring-side connector ring 30 is greater than the outside diameter of the portion of the eyeglass-holder ring 22 passing through the central opening 40 by a pivot-motion clearance amount. Clearance is therefore provided for the second swivel linker 26 and the eyeglass-holder ring 22 to pivot freely relative to one another.

A second pivot axis may be defined for the pivotal connection between the eyeglass-holder ring 22 and the second swivel linker 26 as an axis about which pivotal motion between the eyeglass-holder ring 22 and the swivel linker 26 can occur. The second pivot axis extends approximately in the plane defined by the eyeglass-holder ring 22. The swivel axis of the second swivel linker 26 extends generally perpendicular to the second pivot axis.

As shown best in FIG. 5, a spring-loaded releasable clasp 48 is connected between the first terminal loop 16 of the necklace 14 and a necklace-side connector ring 50 of the first swivel linker 24. The releasable clasp 48 includes a clasp hook 52 connected to a clasp linkage ring 54. A clasp release mechanism 56 of the releasable clasp 48 includes a pivotable hook closure 58 connected to a hook opener lever 60. A clasp pivot spring 62 is coiled about a clasp pivot pin 64 and is biased to urge the pivotable hook closure 58 in a clasp-closed configuration with the hook opener lever 60 urged against a lever rest 66. In the clasp-closed configuration, the hook closure 58 is aligned and in contact with an end of the clasp hook 52 to form a closed loop which retains the necklace-side connector ring 50 of the first swivel linker 24. To open the spring-loaded releasable clasp 48, the hook opener lever 60 is pivoted against the bias of the clasp pivot spring 62 towards a lever stop 68, which pivots the pivotable hook closure 58 away from the end of the clasp hook 52. The necklace-side connector ring 50 may then be removed from the clasp hook 52 of the clasp 48 to open the necklace assembly 10 for removal from around the wearer's neck without having to lift the necklace assembly over the wearer's head.

The first swivel linker 24 includes a holder-ring-side connector ring 70 rotatably connected to the necklace-side connector ring 50 by the pin-and-socket arrangement described above in connection with the second swivel linker 26. As shown in FIG. 6, the eyeglass-holder ring 22 passes through a central opening in the holder-ring-side connector ring 70. Returning to FIG. 5, a first pair of swivel-linker collar stops 72, 74 extend around the eyeglass-holder ring 22 on opposing sides of the holder-ring-side connector ring 70 of the first swivel linker 24 to fix the position of the first swivel linker 24 azimuthally on the eyeglass holder ring 22. Clearances are provided between the swivel-linker collar stops 72, 74 and the holder-ring-side connector ring 70 of the first swivel linker 24 and between inside surfaces of the central opening in the holder-ring-side connector ring 70 and outer surfaces of the portion of the eyeglass-holder ring 22 passing through the central opening to permit the eyeglass-holder ring 22 and the first swivel linker 24 to pivot freely relative to one another. The pivoting of the first swivel linker 24 and the eyeglass-holder ring 22 relative to one another occurs about a pivot axis which extends approximately in the plane of the eyeglass-holder ring 22 and generally perpendicular to a swivel axis of the first swivel linker 24.

Turning again to FIG. 1, the first pair of swivel-linker collar stops 72, 74 and the second pair of swivel-linker collar stops 42, 44 respectively fix the positions of the first and the second swivel linkers 24 and 26 azimuthally at a separation from one another of about 90° of arc about the eyeglass-holder ring 22.

A central opening 76 of the eyeglass-holder ring 22 of the eyeglass-holder assembly 20 defines a temple-piece-receiver ring opening 76. The eyeglasses 12 in a folded closed configuration can be held in the eyeglass-holder ring 22 with temple piece 78 of the eyeglasses extending downwardly from one side of the temple-piece-receiver ring opening 76 and the lens frame 80 of the eyeglasses extending downwardly from the opposite side of the ring opening 76. The first and the second swivel linkers 24 and 26 relieve twisting which can occur in the necklace 14 as a result of movement of the wearer of the eyeglass-holder necklace 10, so that the necklace 14 and the eyeglass-holder assembly 20 bearing the eyeglasses 12 tend to lie neatly on the chest of the wearer.

It is not intended to limit the present invention to the specific embodiments described above. For example, the eyeglass-holder loop of the eyeglass-holder assembly of the necklace assembly of the invention could have an oval, hexagonal, octagonal, serpentine or other non-circular shape. Jewelry chains or strings of beads of a wide variety of styles may be used for the necklace of the necklace assembly of the invention. It is recognized that these and other changes may be made in the necklace assembly of the invention specifically described herein without departing from the scope and teachings of the instant invention, and it is intended to encompass all other embodiments, alternatives, and modifications consistent with the invention.

I claim:

1. A necklace assembly for holding a pair of eyeglasses, the necklace assembly comprising:
   (a) an elongated flexible necklace for wearing about the neck of a wearer, the necklace having a first end and a second end;
   (b) an eyeglass-holder assembly connected between the first and second ends of the necklace, the eyeglass-holder assembly including:
      (b.1) an eyeglass-holder loop, the eyeglass-holder loop having a temple-piece-receiver loop opening passing therethrough shaped and dimensioned to receive a temple piece of a pair of eyeglasses;
      (b.2) a first and second swivel linker, each swivel linker having a necklace-side connector and a holder-loop-side connector, the necklace-side connector and the holder-loop-side connector being rotatably joined together for full rotation about a swivel axis, the holder-loop-side connectors of the first and the second swivel linker being connected to the eyeglass-holder loop at locations spaced apart from one another about the loop; and
   (c) a first necklace/holder-assembly coupler connecting the first end of the necklace with the necklace-side connector of the first swivel linker of the eyeglass-holder assembly and a second necklace/holder-assembly coupler connecting the second end of the necklace with the necklace-side connector of the second swivel linker of the eyeglass-holder assembly, so that in use the necklace assembly may be worn about the neck of a wearer with a pair of eyeglasses in a folded-closed configuration removably pendulously held in the eyeglass-holder loop of the eyeglass-holder assembly with a temple piece extending downwardly from one side of the temple-piece-receiver loop opening and a lens frame of the eyeglasses extending downwardly from an opposite side of the loop opening and with twisting induced in the necklace by movement of the wearer tending to be relieved by rotation of the swivel linkers.

2. The necklace assembly according to claim 1 in which the eyeglass-holder loop is ring shaped.

3. The necklace assembly according to claim 2 in which the holder-loop-side connector of each swivel linker is pivotally connected to the eyeglass-holder loop with an associated pivot axis being defined as an axis about which the swivel linker and the eyeglass-holder loop can pivot relative to one another, the pivot axis associated with each of the swivel linkers lying at least approximately in a plane defined by the ring-shaped temple-piece-receiver loop opening of the eyeglass-holder loop, the swivel axis associated with each swivel linker extending generally perpendicular to the pivot axis associated with the swivel linker.

4. The necklace assembly according to claim 2 in which the ring-shaped eyeglass-holder loop has a diameter in the range of from 0.4 to 1.3 inches.

5. The necklace assembly according to claim 2 in which each of the neck-lace-side connector and the holder-loop-side connector of each swivel linker is generally ring shaped, a first connector of the necklace-side connector and the holder-loop-side connector of each swivel linker having a linker pin projecting generally radially outwardly from an outer circumferential surface of the connector, the linker pin being generally rotationally symmetric about the swivel axis of the swivel linker and having a head portion spaced apart from the outer surface of the first connector and a neck portion extending from the head portion to the outer surface, the head portion of the linker pin having a greater outside diameter than the neck portion, a second connector of the necklace-side connector and the holder-loop-side connector of each swivel linker having a linker-pin retainer bearing socket extending radially inwardly into the connector from an outer circumferential surface of the connector, the linker-pin retainer bearing socket being generally rotationally symmetric about the swivel axis and having a constricted radially outer portion and an expanded radially inner portion, the constricted portion of the linker-pin retainer bearing socket having a smaller inside diameter than the expanded portion, the linker pin of the first connector extending into the linker-pin retainer bearing socket of the second connector, the linker pin and the linker-pin retainer bearing socket being generally complementarily shaped and dimensioned to retain the linker pin within the socket with sufficient dimensional clearance between outer surfaces of the linker-pin and inner surfaces of the linker-pin retainer bearing socket to enable the linker pin to rotate within the socket about the swivel axis of the swivel linker.

6. The necklace assembly according to claim 5 in which the ring-shaped eyeglass-holder loop passes through a central opening of each ring-shaped holder-loop-side connector, an inside diameter of the central opening of each holder-loop-side connector being greater than an outside diameter of the ring-shaped eyeglass-holder loop so that the holder-loop-side connector and the eyeglass-holder loop can pivot relative to one another, the eyeglass-holder loop having a first and second pair of swivel-linker retainer collars associated respectively with each of the first and second swivel linker, each swivel-linker retainer collar projecting outwardly from an outer surface of the eyeglass-holder loop, the swivel-linker retainer collars of each pair being located on opposing sides of the ring-shaped holder-loop-side connector of the associated swivel linker to locate the holder-loop-side connector azimuthally, the holder-loop-side connectors of the first and the second swivel linkers being located respectively by the associated pairs of swivel-linker retainer collars at positions spaced apart from one another azimuthally.

7. The necklace assembly according to claim 2 in which the first and the second swivel linkers are spaced apart from one another azimuthally by an angle in the range of from 55° to 125° of arc about the ring-shaped eyeglass-holder loop.

8. The necklace assembly according to claim 7 in which the first and the second swivel linkers are spaced apart from one another azimuthally by an angle of approximately 90° of arc about the ring-shaped eyeglass-holder loop.

9. The necklace assembly according to claim 2 in which the necklace is a chain.

10. The necklace assembly according to claim 9 in which the first necklace/holder-assembly coupler is a terminal link in the chain of the necklace.

11. The necklace assembly according to claim 1 in which the second necklace/holder-assembly coupler is a releasable clasp.

12. A necklace assembly for holding a pair of eyeglasses, the necklace assembly comprising:
 (a) an elongated flexible necklace chain for wearing about the neck of a wearer, the necklace chain having a first terminal link and a second terminal link;
 (b) an eyeglass-holder assembly connected between the first and second terminal links of the necklace chain, the eyeglass-holder assembly including:
  (b.1) an eyeglass-holder ring, the eyeglass-holder ring defining a temple-piece-receiver ring opening dimensioned to receive a temple piece of a pair of eyeglasses;
  (b.2) a first and second swivel linker, each swivel linker having a necklace-side connector ring and a holder-ring-side connector ring, the necklace-side connector ring and the holder-ring-side connector ring being rotatably joined together for full rotation about a swivel axis, the holder-ring-side connector ring of the first and the second swivel linker being pivotally connected to the eyeglass-holder ring at locations spaced apart from one another azimuthally by an angle in the range of from 55° to 125° of arc about the ring, a pivot axis being defined with respect to the holder-ring-side connector ring of each swivel linker as an axis about which the swivel linker and the eyeglass-holder ring can pivot relative to one another, the pivot axis associated with each of the swivel linkers lying at least approximately in a plane defined by the eyeglass-holder ring, the swivel axis associated with each swivel linker extending generally perpendicular to the pivot axis associated with the swivel linker, the first terminal link of the necklace chain being interlinked with the necklace-side connector ring of the first swivel linker; and
 (c) a spring-loaded releasable clasp connecting the second terminal link of the necklace chain with the necklace-side connector ring of the second swivel linker of the eyeglass-holder assembly, so that in use the necklace assembly may be worn about the neck of a wearer with a pair of eyeglasses in a folded-closed configuration removably pendulously held in the eyeglass-holder ring of the eyeglass-holder assembly with a temple piece extending downwardly from one side of the temple-piece-receiver ring opening and a lens frame of the eyeglasses extending downwardly from an opposite side of the ring opening and with twisting induced in the necklace chain by movement of the wearer tending to be relieved by rotation of the swivel linkers.

* * * * *